United States Patent Office 3,586,670
Patented June 22, 1971

3,586,670
ISOTHIOCYANOBENZAZOLES AND USE THEREOF AS ANTHELMINTICS
Paul Brenneisen and Alfred Margot, Basel, Switzerland, assignors to Geigy Chemical Corporation, Ardsley, N.Y.
No Drawing. Filed July 24, 1968, Ser. No. 747,122
Claims priority, application Switzerland, July 26, 1967, 10,628/67
Int. Cl. C07d 49/38, 85/48
U.S. Cl. 260—240     16 Claims

ABSTRACT OF THE DISCLOSURE

Isothiocyano-substituted 2 - phenyl- and 2 - phenylalkyl-benzoxazoles and -benzimidazoles are disclosed as novel anthelmintic agents. Their production, their use in the control of helminths and compositions containing them are also described. 2-(4'-isothiocyanophenyl)-benzimidazole and -benzoxazole are representative compounds of this novel class of anthelmintics.

---

The present invention concerns new isothiocyanobenzazole derivatives and more particularly benzoxazole and benzimidazole derivatives, processes for the production thereof as well as the use of the new compounds for controlling parasitic helminths and anthelmintic agents containing such active substances.

Of the endoparasites occurring in warm blooded animals, helminths cause grave injuries. For example, not only is the growth or increase in weight of infested animals retarded but often injuries occur as a result of which the animals can die. It is thus of great importance to develop agents for use in veterinary and human medicine which are suitable for the combatting of helminths in all their stages of development and which are also suitable for prevention of infestation of warm-blooded animals by these pests. Although a series of substances having an anthelmintic action is known, such substances are often not completely satisfactory; either they have an insufficient action in tolerable dosages, there are undesirable side effects in therapeutically effective dosages, or they have an unduly narrow spectrum of activities.

The term "helminth" as used in the present specification and claims refers to nematodes, cestodes and trematodes, i.e. especially worms infesting the gastro-intestinal tract, the liver and other organs of warm-blooded animals.

The present invention provides novel isothiocyanobenzazoles of the general Formula I

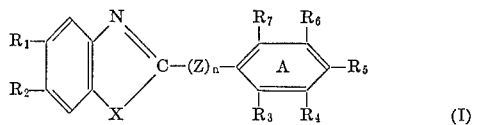

(I)

wherein one or two of the substituents $R_1$ through $R_7$ represent the isothiocyano group and the remaining ones of these substituents represent hydrogen, chlorine, bromine, the hydroxyl, nitro, trifluoromethyl, carboxyl or carbamoyl group, or a lower alkyl, lower alkoxy, lower alkylthio, lower alkylamino, lower alkoxy-carbonyl, di-(lower alkyl) - substituted carbamoyl, di - (lower alkyl)-substituted amino, lower alkanoyl amino, lower alkenyloxy, lower alkenylthio, lower alkanoyloxy or lower alkanoyl group, while $R_6$ and $R_7$ together with the carbon atoms to which they are linked may also represent a benzene ring fused to ring A;

X represents oxygen or the grouping N–R wherein R represents hydrogen, a lower alkyl radical any substituent of which is selected from di-(lower alkyl)-amino, benzoyl and halogeno-benzoyl or the benzyl or a phenyl radical which may be substituted by lower alkyl, or a lower alkanoyl or an unsubstituted or halogeno-substituted bonzoyl radical;

Z represents an aliphatic bridging member having two carbon atoms, and $n$ represents 0 or 1;

and wherein any isothiocyano group must occupy a position other than ortho to any hydroxyl or alkylamino group present at the same ring, and, in those compounds in which X represents NH and $n$ is equal to 0, $R_3$ and $R_7$ do not represent isothiocyano groups, as well as those salts of the compounds of Formula I which are well tolerated by warm-blooded animals in anthelmintically effective doses, are of excellent anthelmintic acitivity and are useful in controlling parasitic helminths in warm-blooded animals.

In those compounds of Formula I which contain the aliphatic bridge member Z the latter is preferably one of the groupings —$CH_2$—$CH_2$— and —CH=CH—.

In particularly preferred compounds of Formula I, X represents NR wherein the substituent R represents preferably hydrogen, in next preferred ones the methyl, benzyl, N-N-dimethylaminoethyl, phenacyl, a bromo-phenacyl or a tolyl group, and in a third preferred group, the acetyl or benzoyl or a chlorobenzoyl group.

The term "lower" used in defining alkyl groups including those occurring in alkylamino, alkoxy and alkylthio radicals means that such radicals have from 1 to 4 carbon atoms, "lower" alkenyl radicals have preferably 3 to 4 carbon atoms, and "lower" alkanoyl groups including those occurring in alkanoyloxy and alkanoylamino radicals have preferably from 2 to 5 carbon atoms. Most preferred compounds, however, have a methyl group as alkyl and an acetyl group as alkanoyl substituents or substituent moieties.

Among the anthelmintically active salts of compounds falling under the general Formula I which are addition salts of the latter compounds with suitable inorganic or organic acids the hydrochlorides are particularly preferred.

The new benzazoles of the general Formula I substituted in 2-position by a mono- or di-nuclear aromatic or araliphatic radical and by one or two isothiocyano groups are produced according to the invention by reacting a benzazole substituted by a mono- or di-nuclear aromatic or araliphatic radical and by at most two primary amino groups in the ring, with a reagent capable of introducing the thiocarbonyl group into amino groups. The reaction is preferably performed in the presence of a solvent or diluent which is inert to the reaction partners.

The following reagents are preferably used in the process according to the invention to introduce a thiacarbonyl group:

(a) a thiacarbonic acid derivative of the general Formula II

Hal—CS—Y (II)

wherein

Hal represents chlorine or bromine,
Y represents chlorine, bromine or a dialkylamino group, and by which formula especially are meant thiophosgene which is reacted at temperatures between 0° and 60° C. preferably in the presence of an acid binding agent, and N,N-diethylthiocarbamoyl chloride which is reacted at temperatures between 40 and 200° C.;

(b) a bis-thiocarbamoyl sulphide of the general Formula III

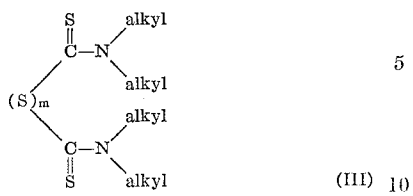

wherein the index $m$ represents 1 or 2, and alkyl is preferably ethyl, in the presence of hydrogen halide;

(c) bis-trichloromethyl pentathio-dipercarbonate;

(d) ammonium rhodanide in the presence of gaseous hydrogen chloride;

(e) phosgene and phosphorus pentasulfide;

(f) carbon disulfide in the presence of an inorganic or organic base, whereby the amino group is first converted into the corresponding dithiocarbamic salt which is subsequently dehydrosulphurised to the isothiocyano group;

(g) ammonium rhodanide and benzoyl chloride, and thermal decomposition to the isothiacyano derivate of the intermediary thiourea;

(h) carbon disulfide and dicyclohexylcarbodiimide in the presence of a tertiary amine.

The reaction with thiophosgene is performed, e.g. according to Houben-Weyl, 4th edition, vol. 9, pages 867 and ff (1955), using acid binding agents according to O. E. Schultz in Arch. Pharm. 295, 146–151 (1962); the reaction with N,N - diethyl-thiocarbamoyl chloride is performed according to J. Org. Chem. 30, 2465 (1965); that with bis-thiocarbamoyl sulphides according to F. H. Marquardt, Helv. Chim. Acta, 49, 1716; that with bis-trichloromethyl pentathio-dipercarbonate is performed according to R. Gottfried, Angew, Chem. 78, 985 (1969); that with ammonium rhodanide and gaseous HCl is performed according to British Pat. No. 1,099,768, and that with phosgene and phosphorus pentasulfide according to Houben-Weyl, 4th edition, vol. 9, pages 867 and ff (1955).

The dehydrosulphurisation following the reaction with carbon disulfide and base can be performed oxidatively with metal salts (British Pat. No. 793,802, Dutch Pat. No. 81,326) e.g. with lead, copper, zinc or iron III-salts, iodine, alkali metal hypochlorites or chlorites, preferably with sodium and potassium salts (French Pat. No. 1,311,855), also with suitable acid halides such as phosgene and phosphorus oxychloride [D. Martin et al., Chem. Ber. 98, 2425–2426 (1965)], also with $Cl_2$ and ammonium sulphide (DAS 1,192,189) or with chloramine T (British Pat. No. 1,024,913).

The reaction with ammonium rhodanide and benzoyl chloride leading first to the thiourea derivative which is then thermally decomposed, e.g., in boiling chlorobenzene to the isothiocyano derivative is performed, e.g., according to Houben-Weyl, 4th edition, vol. 9, pages 867 and ff (1955), and the reaction with carbon disulfide and dicyclohexyl-carbodiimide in the presence of a tertiary amine is performed according to J. C. Jochims, Chem. Ber. 101, 1746 (1968).

The benzazole derivatives of general Formula I can further be obtained by cyclisation reaction of an N-(2-hydroxyphenyl- or 2-sec. amino-phenyl)-aldimine of a benzaldehyde, cinnamaldehyde or 2-phenylpropionaldehyde, the aldimine being substituted by 1 or 2 isothiocyano groups. This reaction is performed with a mild oxidising agent such as nickel peroxide or lead tetra-acetate [Chem. Soc. 1949, 2971, Chem. Abstr. 62, 541 h (1965)], also with chloranil in xylene [Chem. Soc. 1950, 1722] and nitrobenzene [Chem. Abstr. 62, 1639 (1965)].

The new benzazoles of general Formula I which contain a group capable of salt formation can be converted into the corresponding salts with acids which are non-toxic to the human and animal organism and are of sufficient strength to react with said group. Inorganic and organic acids can be used, e.g. hydrohalic acids, sulphuric acid, phosphoric acid, oxalic acid, methane-sulphonic acid, p-toluene-sulphonic acid, etc.

The aminobenzazoles serving as starting materials can be prepared, e.g., according to the following known processes:

(1) Reaction of ortho-phenylenediamines or ortho-amino-phenols resp. with aminobenzoic acids, aminocinnamic acids or aminophenyl-propionic acids resp. or the acid derivatives thereof in polyphosphoric acid as the condensing agent [J. Am. Chem. Soc. 79, 427 (1957)].

(2) Reaction of ortho-phenylenediamines or ortho-amino-phenols with amino- or nitrobenzoic acids, -cinnamic acids or -phenylpropionic acids resp. in metaphosphoric acid ester as the condensing agent [Chem. and Pharm. Bull (Japan) 12, 773 (1964)]. Nitro-benzazoles thus obtained are then reduced to the corresponding amino-benzazoles by known methods.

(3) Reaction of ortho-phenylenediamines or ortho-amino-phenols resp. with an aldehyde corresponding to the acids as used under (1) and (2) above, in the presence of a mild oxidising agent, e.g., with the sodium bisulfite adduct of the corresponding aldehyde [J. Het. Chem. 2, 453 (1963)].

The aminobenzazoles serving as starting materials can be used both in the form of the free bases as well as addition salts with acids, particularly mineral acids. The usual solvents are used for the processes according to the invention such as organic solvents which are inert to the reaction components, e.g. aromatic hydrocarbons, aliphatic and aromatic halogenated hydrocarbons, ether and ether-type compounds, water or mixtures of such solvents with water.

The benzazole compounds according to the invention and their salts have marked anthelmintic activity against the most important nematodes (i.e. Ascaridae, Trichostrongyloidae. Ancyclostromatidae, Strongyloidae), cestodes (i.e. Anopocephalidae, Taeniidae) and trematodes (i.e. Fascioloidae, Schristosomidae) which infest warm-blooded animals including humans. Control of helminths is particularly important in the case of domestic and farm animals, e.g., cattle, hogs, horses, sheep, goats, cats, dogs and poultry. The compounds according to the invention can be administered to the aforesaid animals as a single dosage or repeatedly. In some cases, a better action is attained by protracted administration or smaller total dosages can be used. The active substances or mixtures containing them can also be added to the feed or drink, in which case the concentrations of active substance lie between 0.01 and 1%.

The new benzazole compounds and their salts which are non-toxic to the organism, can be administered in the form of solutions, emulsions, suspensions (drenches), powders, tablets, dragées, boluses and capsules, either orally or by stomach tube.

The usual solid carriers such as kaolin, talcum, bentonite, sodium chloride, calcium phosphate, hydrocarbons, cellulose powders, cotton seed meal, Carbowax, gelatine; or liquids such as water, if desired with the addition of surface active substances such as ionic or non-ionic dispersing agents, oils and other solvents which are not injurious to the animal organism, serve for the preparation of the forms for administration listed above. If the anthelmintic agents are in form of feed concentrates, then carriers are, e.g. formulated foods, cereal feeds or protein concentrates. Such concentrates can contain, in addition to the active substances, also additives, vitamins, antibiotics, chemotherapeutics, bacteriostatics, fungistatics, coccidiostatics, hormone preparations, substances having anabolic activity or other substances which promote growth, influence the meat quality of fat stock animals or are useful in another way for the organism.

For peroral adminisration dosage units such as dragées (sugar coated tablets), tablets, preferably contain 100–500 mg. of an active substance according to the invention, that is 20–80% of a compound of Formula I. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols to form tablets or dragée cores. The latter are coated, e.g. with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g. to distinguish between varying dosages of active substance.

The following prescriptions further illustrate the production of tablets and dragées:

(a) 1000 g. of 2-(4'-isothiocyanophenyl)-benzimidazole hydrochloride are mixed with 550 g. of lactose and 292 g. of potato starch, the mixture is moistened with an aqueous solution of 8.0 g. of gelatine and granulated through a sieve. After drying, 60.0 g. of potato starch, 60.0 g. of talcum, 10.0 g. of magnesium stearate and 20.0 g. of colloidal silicon dixoide are mixed in and the mixture is pressed into 10,000 tablets each weighing 200 mg. and containing 100 mg. of active substance. If desired, the tablets can be grooved for better adaptation of the dosage.

(b) A granulate is produced from 1000 g. of 2-(4'-isothiocyanophenyl)-5-chloro-benzimidazole hydrochloride, 379 g. of lactose and the aqueous solution of 6.0 g. of gelatine. After drying, the granulate is mixed with 10.0 g. of colloidal silicon dioxide, 40.0 g. of talcum, 60.0 g. of potato starch and 5.0 g. of magnesium stearate and the mixture is pressed into 10,000 dragée cores. These are then coated with a concentrated syrup made from 533.5 g. of crystallised saccharose, 20.0 g. of shellac, 75.0 g. of gum arabic, 250 g. of talcum, 20 g. of colloidal silicon dioxide and 1.5 g. of dyestuff, and dried. The dragées obtained each weigh 240 mg. and contain 100 mg. of active substance.

Some tests to determine the anthelmintic activity of the new benzazoles of general Formula I are described below.

Determination of the anthelmintic action on hens infested with *Ascaridia galli*

One to three day old chickens are infested with eggs of *Ascaridia galli* (maw worms). Groups of 5 hens were used for each test. Four to five weeks after infestation, the active substances were administered to the hens in one dose on three consecutive days. Hens infested but not treated served as controls.

Evaluation

The number of *Ascaridia galli* excreted by each group of tested hens within 5 days after the first administration of the active substance was determined daily and the number of worms found in the intestine after killing on the 5th day was also added. In addition the number of hens free from worms was determined.

| | | Daily dose, mg./kg. weight | No. of *Ascaridia galli* from 5 hens | | | | |
|---|---|---|---|---|---|---|---|
| | | | Excreted during test | | Found on dissection | Infestation of the test animals on dissection | General condition |
| | Active substance | | Absolute No. | In percent of total No. | | | |
| a | 2-(4'-isothiocyanostyryl)-benzimidazole hydrochloride hydrate | 500 | 106 | 97 | 3 | 0-0-0-1-2 | Good. |
| b | 2-(4'-isothiocyanostyryl)-5-chlorobenzimidazole hydrochloride hydrate | 500 | 47 | 98 | 1 | 0-0-0-0-1 | Do. |
| c | 2-phenyl-5-isothiocyano-benzimidazole hydrochloride | 500 | 42 | 98 | 1 | 0-0-0-0-1 | Do. |
| d | 2-(4'-isothiocyanostyryl)-benzoxazole | 500 | 34 | 100 | 0 | 0 | Do. |
| e | 2-(4'-isothiocyanostyryl)-5-methoxybenzimidazole hydrochloride hydrate | 500 | 90 | 98 | 2 | 0-0-0-0-2 | Do. |
| f | 2-(4'-isothiocyanophenyl)-benzimidazole hydrochloride | 500 | 49 | 100 | 0 | 0 | Do. |
| g | 2-(3'-isothiocyanostyryl)-5-chlorobenzimidazole hydrochloride hydrate | 500 | 143 | 100 | 0 | 0 | Do. |
| h | 2-(4'-isothiocyanophenyl)-5-chlorobenzimidazole hydrochloride | 500 | 97 | 99 | 1 | 0-0-0-0-1 | Do. |
| i | 1-methyl-2-(3'-isothiocyanostyryl)-benzimidazole | 500 | 55 | 98 | 1 | 0-0-0-0-1 | Do. |
| j | 2-(3'-isothiocyanophenyl)-benzimidazole | 500 | 98 | 97 | 3 | 0-0-3-0-0 | Do. |
| k | 2-(4'-isothiocyanophenyl)-benzimidazole | 300 | 165 | 100 | 0 | 0 | Do. |
| l | 2-[2'-(4''-isothiocyanophenyl)-ethyl]-benzoxazole | 500 | 166 | 99 | 1 | 0-1-0-0-0 | Do. |
| m | 2-[2'-(4''-isothiocyanophenyl)-ethyl]-5-chloro-benzimidazole hydrochloride | 500 | 200 | 98.5 | 3 | 2-1-0-0-0 | Do. |
| n | 2-(2',4'-dichlorostyryl)-5-isothiocyano-benzimidazole hydrochloride | 500 | 133 | 99 | 1 | 0-0-0-1-0 | Do. |
| o | 3-methylallyloxy-isothiocyanobenzene (known from German Patent No. 852,087) | 750 | 171 | 100 | 0 | 0 | 4/5 exitus. |
| p | 2-phenylbenzimidazole (known from U.S. Patent No. 3,080,282) | 1,000 | 69 | 36 | 125 | 7-52-7-32-27 | Good. |
| q | 2-(4'-thiazolyl)-benzimidazole (known from U.S. Patent No. 3,017,415) | 500 | 131 | 100 | 0 | 0 | Do. |

Tests on mice infested with *Hymenolepis nana*

The active substances were forcibly fed, in the form of a suspension, to white mice infested with *Hymenolepis nana*. Five animals were used for each test. The active substances were administered once daily for 1 to 4 consecutive days to each group of animals. The animals were then killed on the eighth day after the start of the test and dissected.

The test was evaluated after dissection of the test animals by counting the tape worms in the intestine. Mice infested simultaneously and in the same way but not treated served as controls.

*Hymenolepis nana*

| | Active substance | Daily dose, mg./kg. weight | Time administered in days | Infestation of the 5 test animals on dissection | Infestation of control animals on dissection |
|---|---|---|---|---|---|
| a | 2-(4'-isothiocyanostyryl)-5-chlorobenzimidazole hydrochloride hydrate | 500 | 3 | 0 | 8-4-8-2-7 |
| b | 2-phenyl-5-isothiocyanobenzimidazole hydrochloride | 600 | 3 | 0 | 4-6-7-1-2 |
| c | 2-(4'-isothiocyanostyryl)-benzoxazole | 600 | 3 | 0 | 6-8-17-19-5-16 |
| d | 1-(4'-tolyl)-2-(3''-isothiocyanostyryl-5-isothiocyano-benzimidazole hydrochloride | 750 | 3 | 0 | 7-11-14-10-2 |
| e | 2-(3',4'-dichlorostyryl)-5-isothiocyanobenzimidazole hydrochloride | 750 | 3 | 0 | 7-14-14-8-4 |
| f | 1-methyl-2-(3'-isothiocyanostyryl)-benzimidazole | 650 | 3 | 0 | 11-5-4-7-6 |
| g | 2-(3'-isothiocyanostyryl)-5-methoxybenzimidazole hydrochloride | 650 | 3 | 0 | 11-5-4-7-6 |
| h | 2-(3'-isothiocyanostyryl)-5,6-dimethylbenzimidazole hydrochloride | 600 | 3 | 0 | 2-11-6-4-13 |
| i | 2-(4'-isothiocyanophenyl)-5-chlorobenzimidazole | 500 | 3 | 0 | 9-4-3-5-4 |
| j | 2-phenyl-5-isothiocyano-benzimidazole | 500 | 3 | 0 | 4-6-11-9-7 |
| k | 2-(3'-isothiocyanophenyl)-benzimidazole | 500 | 3 | 0 | 5-6-10-9-8 |
| l | 2-(4'-isothiocyanophenyl)-benzoxazole | 750 | 3 | 0 | 4-5-1-11-2 |
| m | 2-[2'-(4''-isothiocyanophenyl)-ethyl]-5-chlorobenzimidazole hydrochloride | 500 | 3 | 0 | 8-2-6-9-4 |
| n | 3-butoxy-isothiocyano-benzene (known from German Patent No. 852,087) | 750 | 1 | †††††  | (1) |
| o | 2-phenylbenzimidazole (known from U.S. Patent No. 3,080,282) | 1,000 | 4 | 2-3-4-4-3 | 1-2-2-17-5 |
| p | 2-(4'-thiazolyl)-benzimidazole (known from U.S. Patent No. 3,017,415) | 1,000 | 4 | 8-3-8-22-19 | 8-30-8-24-22 |

1 5/5 exitus.

Tests on rats infested with *Fasciola hepatica*

White laboratory rats are infested with liver flukes (*Fasciola hepatica*). After the latent time, the infestation of the rats by liver flukes is determined by analysis of droppings made at 3 different times.

For each test, two infested rats were forcibly fed with the active substance in the form of a suspension once daily on three consecutive days. Analysis of droppings was made once in the third week and once in the fifth week after administration of the active substance to determine the content of liver flukes. At the end of the fifth week after the beginning of the test, the test animals were killed and the presence of liver flukes was determined.

*Fasciola hepatica*

| | Active substance | Daily dose, mg./kg. weight | Control of excretion for eggs 3 times Before medication | After medication | Number of liver flukes after dissection |
|---|---|---|---|---|---|
| a | 2-(3',4'-dichlorostyryl)-5-isothiocyanobenzimidazole hydrochloride | 100 | Positive | Negative | 0 |
| b | 2-(4'-isothiocyanostyryl)-5-chlorobenzimidazole hydrochloride hydrate | 200 | do | do | 0 |
| c | 2-(4'-isothiocyanostyryl)-benzimidazole hydrochloride | 50 | do | do | 0 |
| d | 2-(4'-isothiocyanophenyl)-5-chlorobezimidazole hydrochloride | 50 | do | do | 0 |
| e | 2-(3'-isothiocyanostyryl)-5-methoxy-benzimidazole hydrochloride | 200 | do | do | 0 |
| f | 2-(3'-isothiocyanostyryl)-5,6-dimethyl-benzimidazole hydrochloride | 100 | do | do | 0 |
| g | 2-(3'-isothiocyanophenyl)-benzimidazole | 100 | do | do | 0 |
| h | 2-(4'-isothiocyanophenyl)-benzimidazole | 50 | do | do | 0 |
| i | 2-[2'-(4''-isothiocyanophenyl)-ethyl]-5-chlorobenzimidazole hydrochloride | 200 | do | do | 0 |
| j | 2-[2'-(4''-isothiocyanophenyl)-ethyl]-5-methoxybenzimidazole hydrochloride | 25 | do | do | 0 |
| k | 2-phenylbenzimidazole (known from U.S. Patent No. 3,080,282) | 200 | Positive | Positive | 9-6-9-3 |
| l | 2-(4'-thiazolyl)-benzimidazole (known from U.S. Patent No. 3,017,415) | 200 | do | do | 4-8-8-6 |
| m | 3-methylallyloxy-isothiocyanobenzene (known from German Patent No. 852,087) | 100 | do | Negative | [1] 0-0 |

[1] 2/4 exitus.

Tests on mice infested with *Schistosoma mansoni*

Groups of 5 mice each, which had been infested with cercariae of *Schistosoma mansoni* for a period of 60 days were forcibly fed with the active substance in the form of a suspension once daily on five resp. ten consecutive days. After each period of 6, 11, 21 and 31 days resp. counting from the first day of administration of active substance, a group of test animals was killed and the number of remaining male(♂) and female(♀) adult Schistosomae in the liver and in the peritoneum was determined. Difference was made between living and dead parasites. Equally sized groups of mice infested simultaneously but not treated served as controls.

The agents were tolerated by the mice without any symptoms.

otherwise stated, "parts" mean parts by weight. The temperatures are given in degrees centigrade.

EXAMPLE 1

(a) 20.9 parts of 2-(4'-aminophenyl)-benzimidazole are added in portions to a well stirred emulsion of 15.4 parts of thiophosgene in 120 parts by volume of ice water. On completion of the addition, the mixture is stirred for 8 hours at room temperature. The precipitate is filtered off, well washed with water, after drying in vacuo it is dispersed with acetone and again filtered. 2-(4'-isothiocyanophenyl)-benzimidazole hydrochloride hydrate are obtained, M.P. 251–253°.

(b) 25 parts of the above hydrochloride are well triturated with 250 parts by volume of 2 N sodium carbonate solution and filtered off. The filter residue is washed well, first with water and then with acetone. The free base is obtained. M.P. 242–245°.

EXAMPLE 2

42 parts of 2-(3',4'-dichlorostyryl-5-aminobenzimidazole are dissolved in 100 parts by volume of dioxane and the solution is added dropwise to an emulsion of 18.3 parts of thiophosgene in 200 parts by volume of ice water while stirring well. After stirring for 12 hours at room temperature, the precipitate which has separated out is filtered off and washed, first with water and then with acetone. After drying in vacuo, 2-(3',4'-dichlorostyrene)-

*Schistosoma mansoni*

| Active substance | Daily dose in mg./kg. weight | Time administered in days | | Infestation of the 5 test animals on dissection | | | | | | |
|---|---|---|---|---|---|---|---|---|---|---|
| | | | | 6th day ♂ | ♀ | 11th day ♂ | ♀ | 21st day ♂ | ♀ | 31st day ♂ ♀ |
| 2-(4'-isothiocyanophenyl)-benzimidazole-hydrochloride | 120 | 5 | Liver | †18 | †8 | | | | | |
| | | | Peritoneum | †5 | 0 | | | | | |
| | 120 | 10 | Liver | | | †14 | †12 | 0 0 | 0 0 | 0 0 |
| | | | Peritoneum | | | 0 | 0 | | | |
| 2-(4'-isothiocyanophenyl)-5-chlorobenzimidazole-hydrochloride | 240 | 10 | Liver | | | †8 | †1 | †12 | †5 | †3 0 |
| | | | Peritoneum | | | 1 | 0 | 0 | 0 | 0 0 |
| Controls | | | Liver | 20 | 12 | 27 | 14 | 23 | 8 | 16 11 |
| | | | Peritoneum | 18 | 10 | 3 | 4 | 13 | 4 | 25 15 |

NOTE.—†=Dead trematodes.

It follows from the preceding test tables that the known compounds used for comparison are either too toxic in therapeutically active doses, and, in smaller doses, ineffective or only insufficiently effective, or that they are only effective against one kind of helminths, e.g., against nematodes (maw worms) but not against cestodes and trematodes or vice versa.

The isothiocyano-benzazoles according to the invention, however, possess an excellent polyvalent activity against all of the different classes of helminths tested.

The following examples serve to illustrate the production processes according to the invention. Where not 5-isothiocyano-benzimidazole hydrochloride decomposes at 280–305° (sublimation at over 240°).

EXAMPLE 3

33.6 parts of 2-(4'-aminophenyl)-benzoxazol are added in portions to a well stirred emulsion of 20 parts of thiophosgene in 200 parts by volume of ice water. On completion of the addition, the mixture is stirred for 8 hours at room temperature; then the precipitate is filtered off, well washed with water, and dried. After recrystallization from acetone, 2-(4'-isothiocyanophenyl)-benzoxazole is obtained, M.P. 157–158°.

EXAMPLE 4

2-(4'-isothiocyanostyryl)-benzoxazole is obtained by the same procedure as described in Example 3 from 20.5 parts of 2-(4'-aminostyryl)-benzoxazole, 11.3 parts of thiophosgene in 100 parts by volume of ice water. After recrystallisation from ether/petroleum ether, it melts at 79–80°.

EXAMPLE 5

15.1 parts of 2-(4'-aminophenyl)-benzoxazole and 11.4 parts of N,N-diethylthiocarbamoyl chloride are refluxed in 200 parts by volume of dry toluene for 4 hours. The hot solution is filtered, the filtrate evaporated, the crystalline residue recrystallized from acetone, and thus 2-(4'-isothiocyanophenyl)-benzazole obtained. M.P. 157–158°.

EXAMPLE 6

Hydrogen chloride is introduced under cooling for a period of 90 minutes into a suspension of 10.5 parts of 2-(4'-aminophenyl)-benzoxazole and 15.4 parts of bis-diethyl-thiocarbamoyl disulfide in 250 parts by volume of dry chlorobenzene. The reaction mixture is then refluxed for 4.5 hours, and subsequently heated with active charcoal and filtered while hot. The filtrate is evaporated and the residue recrystallised from acetone/toluene to yield 2-(4'-isothiocyanophenyl)-benzoxazole which melts at 157–159°.

EXAMPLE 7

10.5 parts of 2-(4'-aminophenyl)-benzoxazole, 7.4 parts of bis-trichloromethanesulfenyl trithiocarbonate (bis-trichloromethyl pentathio-dipercarbonate) and 50 parts by volume of water are stirred together at room temperature for 14 hours. The resulting viscous precipitate is separated, washed with water, and, after drying in vacuo at 60°, it is treated with hot acetone. The resulting solution is filtered, toluene is added, and the solution is then concentrated until a crystalline precipitate is formed. The thus obtained 2 - (4' - isothiocyanophenyl) - benzoxazole melts at 157–159°.

EXAMPLE 8

A stirred suspension of 15.1 parts of 2-(4'-aminophenyl)-benzoxazole in 145 parts by volume of dry chlorobenzene is saturated at room temperature with hydrogen chloride. The mixture is then heated to reflux and 6.6 parts of ammonium thiocyanate (ammonium rhodanide) are added in portions. The reaction mixture is kept at reflux temperature for another 6 hours while a slight steam of hydrogen chloride is introduced. After cooling the precipitate is filtered off and recrystallised from acetone/toluene to yield 2-(4'-isothiocyanophenyl)-benzoxazole. M.P. 158–160°.

EXAMPLE 9

20 parts of phosgene are introduced at 0° into 100 parts by volume of chlorobenzene and then 10.5 parts of 2-(4' - aminophenyl) - benzoxazole added. The resulting suspension is stirred overnight at room temperature. A slight stream of phosgene is then introduced while the suspension is heated up to 90° over a period of 45 minutes. The addition of phosgene is then stopped and the temperature raised to 125–130°. At this temperature the mixture is stirred for about 2 hours until the evolution of gas has stopped completely. After slowly cooling to room temperature 3.75 parts of phosphorus pentasulfide are added, and the resulting mixture heated to reflux temperature under stirring for 14 hours. After filtration while still hot, the filtrate is evaporated and the residue recrystallised from acetone/toluene to yield 2-(4'-isothiocyanophenyl)-benzoxazole. M.P. 157–159°.

EXAMPLE 10

A solution of 15.1 parts of 2-(4'-aminophenyl)-benzoxazole in 360 parts by volume of dry ether is cooled to −10 to −5° and first 31 parts by volume of triethylamine and then 4.3 parts by volume of carbon disulfide are added dropwise. The resulting brown suspension is stirred at room temperature for about 12 hours, cooled to 0°, and 6.7 parts by volume of phosphorus oxychloride in 80 parts by volume of dry ether are added dropwise over a period of 30 minutes, keeping the temperature at 0°. After stirring for about 10 hours at room temperature the precipitate is filtered, washed with ether, then with water and dried. The product is recrystallised from acetone, and 2-(4'-isothiocyanophenyl)-benzoxazole is obtained M.P. 157–158°.

EXAMPLE 11

To a solution of 17 parts of ammonium rhodanide in 200 parts by volume of dry acetone are added 31 parts of benzoyl chloride under stirring. The suspension is heated to reflux temperature and, after 5 minutes, the hot solution of 46 parts of 2-(4'-aminophenyl)-benzoxazole in 400 parts by volume of acetone is added. After stirring for another 2 minutes at reflux temperature the mixture is poured into 5000 parts of ice water. The precipitate is filtered off, washed with water and suspended in 350 parts by volume of 10% sodium hydroxide. The suspension is quickly heated to boiling temperature and kept boiling for about 2 minutes. The resulting solution is cooled in an ice bath, neutralized with 2 N hydrochloric acid, and brought to pH 8 with 2 N ammonia. The precipitate is filtered off, washed with water until neutral, and dried at 80° in vacuo. The finely powdered material is suspended in 500 parts by volume of dry chlorobenzene and refluxed for 14 hours. The clear solution is then evaporated, the residue recrystallised from acetone, and 2-(4'-isothiocyanophenyl)-benzoxazole is obtained. M.P. 157–158°.

EXAMPLE 12

(a) 12.4 parts of N-(2-hydroxyphenyl)-(4'-amino)-benzaldimine hydrochloride are dissolved in 150 parts of ice water. After the addition of 100 parts by volume of chloroform and 34 parts of sodium bicarbonate, 4.4 parts by volume of thiophosgene in 20 parts by volume of chloroform are added dropwise. The resulting emulsion is stirred for 6 hours at room temperature. The chloroform phase is separated, dried with potassium carbonate, treated with active charcoal, filtered, and the filtrate evaporated. The oily residue is dissolved in 100 parts by volume of acetone, and the N-(2-hydroxyphenyl-(4'-isothiocyano)-benzaldimine is precipitated by the addition of ether. Decomposition P. 210°.

(b) 5.3 parts of the benzaldimine obtained under a) and 5.3 parts of chloranil in 130 parts by volume of xylene are refluxed for 4 hours. The reaction mixture is filtered while hot, the filtrate evaporated, and the oily residue recrystallised from acetone/toluene. The thus obtained 2-(4'-isothiocyanophenyl)-benzoxazole melts at 156–158°.

EXAMPLE 13

14.4 parts of 2-(3'-isothiocyanophenyl)-benzimidazole hydrochloride and 17 parts of potassium carbonate are stirred in 500 parts by volume of dry acetone for 60 minutes at reflux temperature. 6.3 parts by volume of benzoyl chloride in 50 parts by volume of dry acetone are then added dropwise. After stirring for 6 hours at reflux temperature the reaction mixture is filterred while hot, the filtrate evaporated, the oily residue taken up in toluene and treated with active charcoal and the purified product eventually recrystallised from ether. 1-benzoyl-2-(3'-isothiocyanophenyl)-benzimidazole is thus obtained. M.P. 124–125°.

EXAMPLE 14

A solution of 25 parts of 2-(4'-isothiocyanophenyl)-benzimidazole and 200 parts by volume of acetone is kept at 20° while a slow stream of hydrogen bromide is introduced until no further precipitate is formed. The precipitate is filtered off washed with acetone and dried. The 2-(4'-isothiocyanophenyl)-benzimidazole hydrobromide is thus obtained, M.P. 260–280° (D.).

In an analogous manner there are obtained the compounds falling under Formulas Ia through Ii, below, in which $R_1$ through $R_7$ and R represent the substituents given in the respective columns of the following Tables I through IX. In the tables $C_6H_5$ represents phenyl and $C_6H_4$ phenylene.

TABLE I 2-phenylbenzimidazoles of the formula

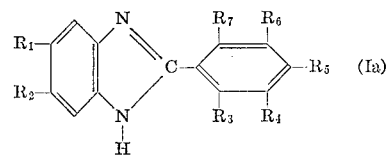

| No. | $R_1$ | $R_2$ | $R_3$ | $R_4$ | $R_5$ | $R_6$ | $R_7$ | Sa t | Melting point (degrees) |
|---|---|---|---|---|---|---|---|---|---|
| 1 | —NCS | H | H | H | H | H | H | | 204–207 |
| 2 | —NCS | H | H | H | H | H | H | HCl | 38. –295 |
| 3 | H | H | H | —NCS | H | H | H | | 225–228 |
| 4 | Cl | H | H | H | —NCS | H | H | | 305 (d) |
| 5 | Cl | H | H | H | —NCS | H | H | HCl | 280–315 |
| 6 | —NCS | H | H | H | $NO_2$ | H | H | | |
| 7 | $-NO_2$ | H | H | H | —NCS | H | H | | |
| 8 | —NCS | H | H | H | —COOH | H | H | | |
| 9 | $CH_3S$— | H | H | H | —NCS | H | H | | |
| 10 | tert.—$C_4H_9$— | H | H | H | —NCS | H | H | | |
| 11 | —NCS | H | H | H | $-CONH_2$ | H | H | | |
| 12 | —NCS | H | H | H | $-CON(CH_3)_2$ | H | H | | |
| 13 | —NCS | H | H | H | Br | H | H | | |
| 14 | —NCS | H | H | H | $-N(CH_3)_2$ | H | H | | |
| 15 | H | H | H | H | —NCS | —CH=CH—CH=CH— | | | |
| 16 | —NCS | H | H | H | $-NHCH_3$ | H | H | | |
| 17 | $CH_3.CONH$— | H | H | H | —NCS | H | H | | |
| 18 | —NCS | H | H | H | $-NHCOCH_3$ | H | H | | |
| 19 | —NCS | H | H | H | H | —CH=CH—CH=CH— | | | |
| 20 | —NCS | H | H | H | $-CH_3$ | H | H | | |
| 21 | —NCS | H | H | $CH_3$ | $CH_3$ | H | H | | |
| 22 | —NCS | H | H | H | —OH | H | H | | |
| 23 | —NCS | H | H | H | $-O-CH_2-CH=CH_2$ | H | H | | |
| 24 | —NCS | H | H | H | $-S-CH_2-CH=CH_2$ | H | H | | |
| 25 | —NCS | H | H | H | $-O-CH_2CH_2-N(CH_3)_2$ | H | H | | |
| 26 | —NCS | H | H | H | $-O-COCH_3$ | H | H | | |
| 27 | HOOC— | H | H | H | —NCS | H | H | | |
| 28 | —NCS | H | H | H | $-COOCH_3$ | H | H | | |
| 29 | $CF_3$ | H | H | H | —NCS | H | H | | |
| 30 | —NCS | H | H | H | $-CH_2-CH_3$ | H | H | | |
| 31 | —NCS | H | H | H | $-COCH_3$ | H | H | | |

TABLE II 2-phenylbenzimidazoles (1-substituted) of the formula:

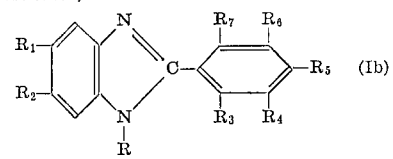

| No. | $R_1$ | $R_2$ | $R_3$ | $R_4$ | $R_5$ | $R_6$ | $R_7$ | R | Melting point |
|---|---|---|---|---|---|---|---|---|---|
| 1 | $CH_3$ | $CH_3$ | H | H | —NCS | H | H | $-COCH_3$ | |
| 2 | H | H | H | H | —NCS | H | H | $-COCH_3$ | |
| 3 | Cl | H | H | H | —NCS | H | H | $-COCH_3$ | |
| 4 | $CH_3O$— | H | H | H | —NCS | H | H | $-COCH_3$ | |
| 5 | $CH_3$ | $CH_3$ | H | H | —NCS | H | H | $-CO-C_6H_5$ | |
| 6 | H | H | H | H | —NCS | H | H | $-CO-C_6H_5$ | |
| 7 | Cl | H | H | H | —NCS | H | H | $-CO-C_6H_5$ | |
| 8 | $CH_3O$— | H | H | H | —NCS | H | H | $-CO-C_6H_5$ | |
| 9 | H | H | H | H | —NCS | H | H | $-CO-C_6H_5-Cl(p)$ | |
| 10 | H | H | H | H | —NCS | H | H | $-CH_3$ | |
| 11 | —NCS | H | H | H | H | H | H | $-CH_3$ | |
| 12 | Cl | H | H | H | —NCS | H | H | $-CH_3$ | |
| 13 | $CH_3O$— | H | H | H | —NCS | H | H | $-CH_3$ | |
| 14 | H | H | H | H | —NCS | H | H | $-CH_2C_6H_5$ | |
| 15 | —NCS | H | H | H | H | H | H | $-CH_2C_6H_5$ | |
| 16 | Cl | H | H | H | —NCS | H | H | $-CH_2-C_6H_5$ | |
| 17 | $CH_3O$— | H | H | H | —NCS | H | H | $-CH_2-C_6H_5$ | |
| 18 | $CH_3$ | $CH_3$ | H | H | —NCS | H | H | $-CH_3$ | |
| 19 | $CH_3$ | $CH_3$ | H | H | —NCS | H | H | $-CH_3$ | |
| 20 | H | H | H | H | —NCS | H | H | $-CH_2-CO-C_6H_5$ | |
| 21 | H | H | H | H | —NCS | H | H | $-CH_2-CO-C_6H_4-Br(p)$ | |
| 22 | H | H | H | H | —NCS | H | H | $-CH_2CH_2N(CH_3)_2$ | |
| 23 | —NCS | H | H | H | H | H | H | $-CH_2CH_2N(CH_3)_2$ | |

TABLE III 2-phenethylbenzimidazoles of the formula:

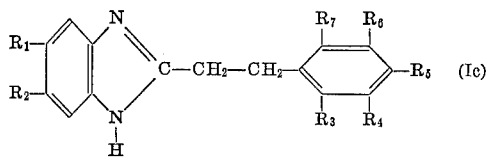

| No. | $R_1$ | $R_2$ | $R_3$ | $R_4$ | $R_5$ | $R_6$ | $R_7$ | Salt | Melting point (degrees) |
|---|---|---|---|---|---|---|---|---|---|
| 1 | Cl | H | H | H | —NCS | H | H | HCl | 218–226 |
| 2 | $CH_3O$— | H | H | H | —NCS | H | H | HCl | 204–224 |
| 3 | $CH_3$ | $CH_3$ | H | H | —NCS | H | H | HCl | 218–230 |
| 4 | —NCS | H | H | H | $NO_2$ | H | H | | |
| 5 | $NO_2$ | H | H | H | —NCS | H | H | | |
| 6 | —NCS | H | H | H | COOH | H | H | | |
| 7 | $CH_3S$ | H | H | H | —NCS | H | H | | |
| 8 | tert.—$C_4H_9$ | H | H | H | —NCS | H | H | | |
| 9 | —NCS | H | H | H | —$CONH_2$ | H | H | | |
| 10 | —NCS | H | H | H | —CO—$N(CH_3)_2$ | H | H | | |
| 11 | —NCS | H | H | H | Br | H | H | | |
| 12 | —NCS | H | H | H | —$N(CH_3)_2$ | H | H | | |
| 13 | H | H | H | H | —NCS | —CH=CH—CH=CH— | | | |
| 14 | —NCS | H | H | H | —NH—$CH_3$ | H | H | | |
| 15 | $CH_3CONH$— | H | H | H | —NCS | H | H | | |
| 16 | —NCS | H | H | H | —$NHCOCH_3$ | H | H | | |
| 17 | —NCS | H | H | H | H | —CH=CH—CH=CH— | | | |
| 18 | —NCS | H | H | H | $CH_3$ | H | H | | |
| 19 | —NCS | H | H | $CH_3$ | $CH_3$ | H | H | | |
| 20 | —NCS | H | H | H | OH | H | H | | |
| 21 | —NCS | H | H | H | —O—$CH_2$—CH=$CH_2$ | H | H | | |
| 22 | —NCS | H | H | H | —S—$CH_2$—CH=$CH_2$ | H | H | | |
| 23 | —NCS | H | H | H | —O—$CH_2CH_2N(CH_3)_2$ | H | H | | |
| 24 | —NCS | H | H | H | —O—$COCH_3$ | H | H | | |
| 25 | —HOOC— | H | H | H | —NCS | H | H | | |
| 26 | —NCS | H | H | H | —$COOCH_3$ | H | H | | |
| 27 | $CF_3$ | H | H | H | —NCS | H | H | | |
| 28 | —NCS | H | H | H | —$CH_2CH_3$ | H | H | | |
| 29 | —NCS | H | H | H | —$COCH_3$ | H | H | | |

TABLE IV 2-phenethylbenzimidazoles (1-substituted) of the formula:

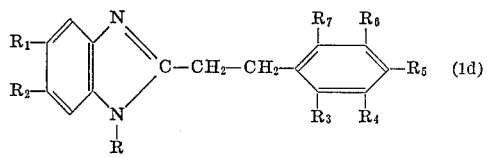

| No. | $R_1$ | $R_2$ | $R_3$ | $R_4$ | $R_5$ | $R_6$ | $R_7$ | R | Melting point |
|---|---|---|---|---|---|---|---|---|---|
| 1 | $CH_3$ | $CH_3$ | H | H | —NCS | H | H | —$COCH_3$ | |
| 2 | H | H | H | H | —NCS | H | H | —$COCH_3$ | |
| 3 | Cl | H | H | H | —NCS | H | H | —$COCH_3$ | |
| 4 | $CH_3O$— | H | H | H | —NCS | H | H | —$COCH_3$ | |
| 5 | $CH_3$ | $CH_3$ | H | H | —NCS | H | H | —CO—$C_6H_5$ | |
| 6 | H | H | H | H | —NCS | H | H | —CO—$C_6H_5$ | |
| 7 | Cl | H | H | H | —NCS | H | H | —CO—$C_6H_5$ | |
| 8 | $CH_3O$— | H | H | H | —NCS | H | H | —CO—$C_6H_5$ | |
| 9 | H | H | H | H | —NCS | H | H | —CO—$C_6H_4$—Cl(p) | |
| 10 | H | H | H | H | —NCS | H | H | —$CH_3$ | |
| 11 | —NCS | H | H | H | H | H | H | —$CH_3$ | |
| 12 | Cl | H | H | H | —NCS | H | H | —$CH_3$ | |
| 13 | $CH_3O$— | H | H | H | —NCS | H | H | —$CH_3$ | |
| 14 | H | H | H | H | —NCS | H | H | —$CH_2$—$C_6H_5$ | |
| 15 | —NCS | H | H | H | H | H | H | —$CH_2$—$C_6H_5$ | |
| 16 | Cl | H | H | H | —NCS | H | H | —$CH_2$—$C_6H_5$ | |
| 17 | $CH_3O$— | H | H | H | —NCS | H | H | —$CH_2$—$C_6H_5$ | |
| 18 | $CH_3$ | $CH_3$ | H | H | —NCS | H | H | —$CH_2$—$C_6H_5$ | |
| 19 | $CH_3$ | $CH_3$ | H | H | —NCS | H | H | —$CH_3$ | |
| 20 | H | H | H | H | —NCS | H | H | —$CH_2$—CO—$C_6H_5$ | |
| 21 | H | H | H | H | —NCS | H | H | —$CH_2$—CO—$C_6H_4$—Br(p) | |
| 22 | H | H | H | H | —NCS | H | H | —$CH_2CH_2N(CH_3)_2$ | |
| 23 | —NCS | H | H | H | H | H | H | —$CH_2CH_2N(CH_3)_2$ | |

TABLE V 2-styrylbenzimidazoles of the formula:

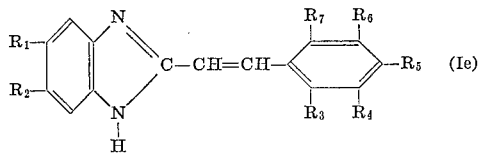

(Ie)

| No. | R₁ | R₂ | R₃ | R₄ | R₅ | R₆ | R₇ | Salt | Melting point (degrees) |
|---|---|---|---|---|---|---|---|---|---|
| 1 | —NCS | H | H | H | Cl | H | H | HCl | 245–270 |
| 2 | —NCS | H | Cl | H | Cl | H | H | HCl | 228–231 |
| 3 | H | H | H | H | —NCS | H | H | HCl, H₂O | 254–256 |
| 4 | Cl | H | H | H | —NCS | H | H | | 251–256 |
| 5 | Cl | H | H | —NCS | H | H | H | HCl, H₂O | 250–251 |
| 6 | Cl | H | CH₃ | H | —NCS | H | H | HCl, H₂O | 256–258 |
| 7 | CH₃ | CH₃ | H | —NCS | H | H | H | HCl | 270–273 |
| 8 | CH₃ | CH₃ | H | H | —NCS | H | H | HCl | 258–264 |
| 9 | CH₃O— | H | H | —NCS | H | H | H | HCl | 235 (d) |
| 10 | CH₃O— | H | H | H | —NCS | H | H | HCl, H₂O | 250–260 |
| 11 | —NCS | H | H | H | —NCS | H | H | HCl | 220 (d) |
| 12 | —NCS | H | H | —NCS | H | H | H | HCl | 238–240 |
| 13 | —NCS | H | H | H | NO₂ | H | H | | |
| 14 | NO₂ | H | H | H | —NCS | H | H | | |
| 15 | —NCS | H | H | H | COOH | H | H | | |
| 16 | CH₃S— | H | H | H | —NCS | H | H | | |
| 17 | tert.—C₄H₉ | H | H | H | —NCS | H | H | | |
| 18 | —NCS | H | H | H | —CONH₂ | H | H | | |
| 19 | —NCS | H | H | H | —CON(CH₃)₂ | H | H | | |
| 20 | —NCS | H | H | H | Br | H | H | | |
| 21 | —NCS | H | H | H | —N(CH₃)₂ | H | H | | |
| 22 | H | H | H | H | —NCS | —CH=CH—CH=CH— | H | | |
| 23 | —NCS | H | H | H | —NH—CH₃ | H | H | | |
| 24 | CH₃CONH— | H | H | H | —NCS | H | H | | |
| 25 | —NCS | H | H | H | —NHCOCH₃ | H | H | | |
| 26 | —NCS | H | H | H | H | —CH=CH—CH=CH— | H | | |
| 27 | —NCS | H | H | H | CH₃ | H | H | | |
| 28 | —NCS | H | H | CH₃ | CH₃ | H | H | | |
| 29 | —NCS | H | H | H | OH | H | H | | |
| 30 | —NCS | H | H | H | —O—CH₂—CH=CH₂ | H | H | | |
| 31 | —NCS | H | H | H | —S—CH₂—CH=CH₂ | H | H | | |
| 32 | —NCS | H | H | H | —OCH₂CH₂N-(CH₃)₂ | H | H | | |
| 33 | —NCS | H | H | H | —OCOCH₃ | H | H | | |
| 34 | HOOC— | H | H | H | —NCS | H | H | | |
| 35 | —NCS | H | H | H | —COOCH₃ | H | H | | |
| 36 | CF₃ | H | H | H | —NCS | H | H | | |
| 37 | —NCS | H | H | H | —CH₂CH₃ | H | H | | |
| 38 | —NCS | H | H | H | —COCH | H | H | | |
| 39 | H | H | —NCS | H | H | H | H | | |

TABLE VI 2-styrylbenzimidazoles (1-substituted) of the formula:

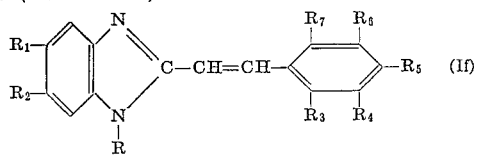

(If)

| No. | R₁ | R₂ | R₃ | R₄ | R₅ | R₆ | R₇ | R | Salt | Melting point (degrees) |
|---|---|---|---|---|---|---|---|---|---|---|
| 1 | H | H | H | —NCS | H | H | H | CH₃ | | 139–143 |
| 2 | H | H | H | —NCS | H | H | H | CH₃ | HCl | 245 (d) |
| 3 | —NCS | H | H | H | —NCS | H | H | —C₆H₄—CH₃(p) | HCl | 200–209 |
| 4 | —NCS | H | H | —NCS | H | H | H | —C₆H₄—CH₃(p) | HCl | 188–200 |
| 5 | CH₃ | CH₃ | H | H | —NCS | H | H | —COOH | | |
| 6 | H | H | H | H | —NCS | H | H | —COCH₄ | | |
| 7 | Cl | H | H | H | —NCS | H | H | —COCH₃ | | |
| 8 | CH₃O— | H | H | H | —NCS | H | H | —COCH₃ | | |
| 9 | CH₃ | CH₃ | H | H | —NCS | H | H | —CO—C₆H₅ | | |
| 10 | H | H | H | H | —NCS | H | H | —CO—C₆H₅ | | |
| 11 | Cl | H | H | H | —NCS | H | H | —CO—C₆H₅ | | |
| 12 | CH₃O— | H | H | H | —NCS | H | H | —CO—C₆H₅—Cl(p) | | |
| 13 | H | H | H | H | —NCS | H | H | —CH₃ | | |
| 14 | H | H | H | H | —NCS | H | H | —CH₃ | | |
| 15 | —NCS | H | H | H | H | H | H | —CH₃ | | |
| 16 | Cl | H | H | H | —NCS | H | H | —CH₃ | | |
| 17 | CH₃O— | H | H | H | —NCS | H | H | —CH₃ | | |
| 18 | H | H | H | H | —NCS | H | H | —CH₂—C₆H₅ | | |
| 19 | —NCS | H | H | H | H | H | H | —CH₂—C₆H₅ | | |
| 20 | Cl | H | H | H | —NCS | H | H | —CH₂—C₆H₅ | | |
| 21 | CH₃O— | H | H | H | —NCS | H | H | —CH₂—C₆H₅ | | |
| 22 | CH₃ | CH₃ | H | H | —NCS | H | H | —CH₂—C₆H₅ | | |
| 23 | CH₃ | CH₃ | H | H | —NCS | H | H | —CH₃ | | |
| 24 | H | H | H | H | —NCS | H | H | —CH₂—CO—C₆H₅ | | |
| 25 | H | H | H | H | —NCS | H | H | —CH₂CO—C₆H₄—Br(p) | | |
| 26 | H | H | H | H | —NCS | H | H | —CH₂CH₂N(CH₃)₂ | | |
| 27 | —NCS | H | H | H | H | H | H | —CH₂CH₂N(CH₃)₂ | | |
| 28 | —NCS | H | H | H | —NCS | H | H | —C₆H₅ | | |

TABLE VII 2-phenylbenzoxazoles of the formula:

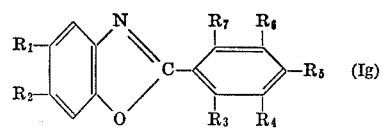 (Ig)

| No. | R₁ | R₂ | R₃ | R₄ | R₅ | R₆ | R₇ | Salt | Melting point (degrees) |
|---|---|---|---|---|---|---|---|---|---|
| 1 | —NCS | H | H | H | H | H | H | | 154–155 |
| 2 | H | —NCS | H | H | H | H | H | | 134–135 |
| 3 | H | —NCS | H | H | NO₂ | H | H | | |
| 4 | H | NO₂ | H | H | —NCS | H | H | | |
| 5 | H | —NSC | H | H | Cl | H | H | | |
| 6 | H | Cl | H | H | —NCS | H | H | | |
| 7 | H | CH₃ | H | H | —NCS | H | H | | |
| 8 | H | —NCS | H | H | —OH | H | H | | |
| 9 | H | —NCS | H | H | —COOH | H | H | | |
| 10 | H | —NCS | H | H | —COOCH₃ | H | H | | |
| 11 | H | —NCS | H | H | CH₃ | H | H | | |
| 12 | H | H | H | H | —NCS | —CH=CH—CH=CH— | | | |
| 13 | —NCS | H | H | H | H | —CH=CH—CH=CH— | | | |
| 14 | H | —NCS | H | H | —N(CH₃)₂ | H | H | | |
| 15 | H | —NCS | H | H | —CON(CH₃)₂ | H | H | | |
| 16 | H | —NCS | H | H | Br | H | H | | |
| 17 | H | Br | H | H | —NCS | H | H | | |
| 18 | CH₃ | CH₃ | H | H | —NCS | H | H | | |
| 19 | H | —NCS | H | H | —NCS | H | H | | |
| 20 | H | CH₂O | H | H | —NCS | H | H | | |
| 21 | H | CH₃O— | H | H | —NCS | H | H | | |
| 22 | H | CH₃CONH— | H | H | —NCS | H | H | | |
| 23 | H | H | —NCS | H | H | H | H | | |

TABLE VIII 2-phenethylbenzoxazoles of the formula:

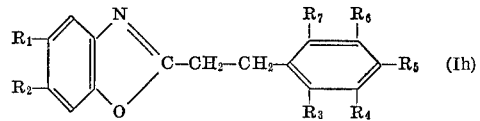 (Ih)

| No. | R₁ | R₂ | R₃ | R₄ | R₅ | R₆ | R₇ | Salt | Melting point (degrees) |
|---|---|---|---|---|---|---|---|---|---|
| 1 | H | H | H | H | —NCS | H | H | | 79–80 |
| 2 | H | —NCS | H | H | NO₂ | H | H | | |
| 3 | H | NO₂ | H | H | —NCS | H | H | | |
| 4 | H | —NCS | H | H | Cl | H | H | | |
| 5 | H | Cl | H | H | —NCS | H | H | | |
| 6 | H | CH₃ | H | H | —NCS | H | H | | |
| 7 | H | —NCS | H | H | —OH | H | H | | |
| 8 | H | —NCS | H | H | —COOH | H | H | | |
| 9 | H | —NCS | H | H | —COOCH₃ | H | H | | |
| 10 | H | —NCS | H | H | CH₃ | H | H | | |
| 11 | H | H | H | H | —NCS | —CH=CH—CH=CH— | | | |
| 12 | —NCS | H | H | H | H | —CH=CH—CH=CH— | | | |
| 13 | H | —NCS | H | H | —N(CH₃)₂ | H | H | | |
| 14 | H | —NCS | H | H | —CON(CH₃)₂ | H | H | | |
| 15 | H | —NCS | H | H | Br | H | H | | |
| 16 | H | Br | H | H | —NCS | H | H | | |
| 17 | CH₃ | CH₃ | H | H | —NCS | H | H | | |
| 18 | H | —NCS | H | H | —NCS | H | H | | |
| 19 | H | CH₃O— | H | H | —NCS | H | H | | |
| 20 | H | CH₃S— | H | H | —NCS | H | H | | |
| 21 | H | CH₃CONH— | H | H | —NCS | H | H | | |
| 22 | H | H | —NCS | H | H | H | H | | |

TABLE IX 2-styrylbenzoxazoles of the formula:

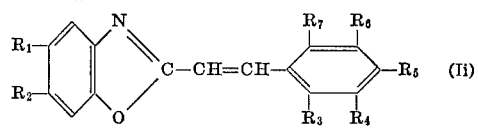 (Ii)

| No. | R₁ | R₂ | R₃ | R₄ | R₅ | R₆ | R₇ | Salt | Melting point (degrees) |
|---|---|---|---|---|---|---|---|---|---|
| 1 | H | —NCS | H | H | NO₂ | H | H | | |
| 2 | H | NO₂ | H | H | —NCS | H | H | | |
| 3 | H | —NCS | H | H | Cl | H | H | | |
| 4 | H | Cl | H | H | —NCS | H | H | | |
| 5 | H | CH₃ | H | H | —NCS | H | H | | |
| 6 | H | —NCS | H | H | —OH | H | H | | |
| 7 | H | —NCS | H | H | —COOH | H | H | | |
| 8 | H | —NCS | H | H | —COOCH₃ | H | H | | |
| 9 | H | —NCS | H | H | CH₃ | H | H | | |
| 10 | H | H | H | H | —NCS | —CH=CH—CH=CH— | | | |
| 11 | —NCS | H | H | H | H | —CH=CH—CH=CH— | | | |
| 12 | H | —NCS | H | H | —N(CH₃)₂ | H | H | | |
| 13 | H | —NCS | H | H | —CON(CH₃)₂ | H | H | | |
| 14 | H | —NCS | H | H | Br | H | H | | |
| 15 | H | Br | H | H | —NCS | H | H | | |
| 16 | CH₃ | CH₃ | H | H | —NCS | H | H | | |
| 17 | H | —NCS | H | H | —NCS | H | H | | |
| 18 | H | —CH₃O | H | H | —NCS | H | H | | |
| 19 | H | —CH₃S | H | H | —NCS | H | H | | |
| 20 | H | CH₃CONH— | H | H | —NCS | H | H | | |
| 21 | H | H | —NCS | H | H | H | H | | |

We claim:
1. A compound selected from
(a) an isothiocyano-substituted benzazole of the formula

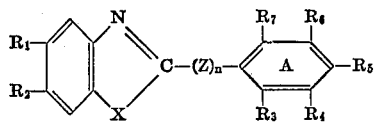

wherein
one or two of $R_1$, $R_2$, $R_3$, $R_4$ and $R_5$ is isothiocyano, with no more than one isothiocyano group on each ring,
one of $R_1$ and $R_2$ (if not isothiocyano) is hydrogen, chlorine, bromine, nitro, trifluoromethyl, carboxyl, lower alkyl, lower alkoxy, lower alkylthio or lower alkanoyl-amino; and the other of $R_1$ and $R_2$ (if not isothiocyano) is hydrogen or lower alkyl,
each of $R_3$ and $R_4$ (if not isothiocyano) is hydrogen, hydroxyl, chlorine, lower alkyl or lower alkoxy,
$R_5$ (if not isothiocyano) is hydrogen, chlorine, bromine, hydroxyl, nitro, trifluoromethyl, carboxyl, carbamoyl, lower alkyl, lower alkoxy, lower alkylthio, lower alkylamino, lower alkoxycarbonyl, di-(lower alkyl) carbamoyl, di-(lower alkyl)-amino, lower alkanoyl-amino, lower alkenyloxy, lower alkenylthio, lower alkanoyloxy or lower alkanoyl,
each of $R_6$ and $R_7$ is hydrogen or $R_6$ and $R_7$ together with the carbon atoms of ring A to which they are linked represents a benzene ring fused to ring A,
X is oxygen or the grouping N—R in which R represents hydrogen, lower alkyl, di-(lower alkyl)-amino-lower alkyl, benzoyl-lower alkyl, halogenobenzoyl-lower alkyl, benzyl, phenyl, lower alkylphenyl, lower alkanoyl, benzoyl or halogenobenzoyl,
Z represents —CH$_2$—CH$_2$— or —CH=CH—,
$n$ is 0 or 1, and
wherein no isothiocyano group occupies a position other than ortho to any hydroxyl or alkylamino group on the same ring, and wherein $R_3$ may not be isothiocyano when X represents N—H and $n$ is 0; and
(b) when X in said compound represents N—R, an addition salt of said compound with an acid of sufficient strength to form such salt with said N—R group.

2. A compound as defined in claim 1 wherein X represents NR.
3. A compound as defined in claim 1 wherein $n$ is 0.
4. A compound as defined in claim 2 wherein $n$ is 1 and Z represents —CH$_2$—CH$_2$—.
5. A compound as defined in claim 2 wherein $n$ is 1 and X represents —CH=CH—.
6. A compound as defined in claim 1 wherein X represents oxygen.
7. A compound as defined in claim 6 wherein $n$ is 1 and Z represents —CH$_2$—CH$_2$—.
8. A compound as defined in claim 6 wherein $n$ is 1 and Z represents —CH=CH—.
9. A compound as defined in claim 6 wherein $n$ is 0.
10. A compound as defined in claim 1 which is 2-(4'-isothiocyanophenyl)-benzimidazole or an addition salt thereof with an acid.
11. A compound as defined in claim 1 which is 2-(4'-isothiocyanophenyl)-5-chloro-benzimidazole or an addition salt thereof with an acid.
12. A compound as defined in claim 1 which is 2-[2'-(4''-isothiocyanophenyl)-ethyl]-5-methoxy-benzimidazole or an addition salt thereof with an acid.
13. A compound as defined in claim 1 which is 2-(3'-isothiocyanostyryl)-5-chloro-benzimidazole or an addition salt thereof with an acid.
14. A compound as defined in claim 1 which is 2-(3'-isothiocyanostyryl)-5,6-dimethyl-benzimidazole or an addition salt thereof with an acid.
15. A compound as defined in claim 1 which is 2-(4'-isothiocyanophenyl)-benzoxazole.
16. A compound as defined in claim 1 which is 2-(4'-isothiocyanostyryl)-benzoxazole.

References Cited
UNITED STATES PATENTS

| | | | |
|---|---|---|---|
| 3,080,282 | 3/1963 | Shunk | 260—309.2X |
| 3,158,610 | 11/1964 | Buell | 260—240 |
| 3,262,929 | 7/1966 | Okubo et al. | 260—240 |

JOHN D. RANDOLPH, Primary Examiner

U.S. Cl. X.R.

260—240.9, 307, 309.2, 552; 424—272, 273